US011888637B2

(12) United States Patent
Dillon et al.

(10) Patent No.: US 11,888,637 B2
(45) Date of Patent: Jan. 30, 2024

(54) SECURE ACCESS FOR VCORES

(71) Applicant: ARRIS Enterprises LLC, Suwanee, GA (US)

(72) Inventors: Timothy Dillon, Westford, MA (US);
Shawn Warner, Pepperell, MA (US);
Yao Zhidong, Westford, MA (US);
Jonathan Sawin, Tyngsboro, MA (US);
Karthik Rajalingari, Cupertino, CA (US); Derek Gilmore, Banbridge (IE)

(73) Assignee: ARRIS Enterprises LLC, Suwanee, GA (US)

( * ) Notice: Subject to any disclaimer, the term of this patent is extended or adjusted under 35 U.S.C. 154(b) by 150 days.

(21) Appl. No.: 17/323,691

(22) Filed: May 18, 2021

(65) Prior Publication Data

US 2022/0337445 A1    Oct. 20, 2022

Related U.S. Application Data

(60) Provisional application No. 63/177,310, filed on Apr. 20, 2021.

(51) Int. Cl.
*H04L 12/28* (2006.01)
*H04L 61/4511* (2022.01)
(Continued)

(52) U.S. Cl.
CPC ...... *H04L 12/2801* (2013.01); *H04L 12/2898* (2013.01); *H04L 12/4633* (2013.01);
(Continued)

(58) Field of Classification Search
None
See application file for complete search history.

(56) References Cited

U.S. PATENT DOCUMENTS 10,567,288 B1 * 2/2020 Mutnuru ............. H04L 41/0893
2013/0152194 A1 * 6/2013 Barak ................. G06F 21/6218
726/21
(Continued)

FOREIGN PATENT DOCUMENTS

CN    102055737 A  *  5/2011  ............. H04L 69/12
WO    202106621 A1     4/2021

OTHER PUBLICATIONS

Emmendorfer, Michael J: "WB1.2—Cable Operator's Access Architecture from Aggregation to Disaggregation and Distributed (Plenary)", 2019 IEEE, Jul. 8, 2019 (Jul. 8, 2019), p. 1, XP033598365, DOI: 10.1109/PHOSST.2019.8795043 [retrieved on Aug. 12, 2019] the whole document.

(Continued)

*Primary Examiner* — Jay L Vogel
(74) *Attorney, Agent, or Firm* — Chernoff, Vilhauer, McClung & Stenzel, LLP

(57) ABSTRACT

A cable distribution system includes a head end connected to a plurality of customer devices through a transmission network that includes a remote fiber node, that converts received data to analog data suitable to be provided on a coaxial cable for the plurality of customer devices. The plurality of vCores instantiated on at least one of servers is configured within a container to provide services to the plurality of customer devices through the transmission network, where each of the vCores includes a service endpoint that is accessible from within the container while each of the vCores does not include a service endpoint that is directly accessible from a network address exterior to the container. A gateway instantiated one of the servers within the container provides access to each of the vCores using said service endpoint over a non-encrypted channel, and provides (Continued)

access to the gateway from a network address exterior to the container over an encrypted channel.

12 Claims, 6 Drawing Sheets

(51) Int. Cl.
*H04L 12/66* (2006.01)
*H04L 9/40* (2022.01)
*H04L 12/46* (2006.01)

(52) U.S. Cl.
CPC .......... *H04L 12/4641* (2013.01); *H04L 12/66* (2013.01); *H04L 61/4511* (2022.05); *H04L 63/18* (2013.01)

(56) References Cited

U.S. PATENT DOCUMENTS

| | | | |
|---|---|---|---|
| 2015/0092531 A1* | 4/2015 | Bernstein | H04L 41/0672 370/254 |
| 2015/0121377 A1* | 4/2015 | Zang | G06F 9/45558 718/1 |
| 2015/0212902 A1* | 7/2015 | Horspool | G06F 3/067 707/654 |
| 2017/0244577 A1 | 8/2017 | Patrick et al. | |
| 2018/0063103 A1* | 3/2018 | Jahid | H04L 63/0807 |
| 2018/0302299 A1* | 10/2018 | Sun | H04L 67/10 |
| 2018/0375897 A1* | 12/2018 | Kawasaki | H04L 63/1433 |
| 2019/0007378 A1* | 1/2019 | Jowett | H04L 63/0428 |
| 2019/0124407 A1* | 4/2019 | Shen | H04N 21/6118 |
| 2021/0136050 A1* | 5/2021 | Leventer | H04L 12/4633 |
| 2022/0103455 A1* | 3/2022 | Lim | H04L 41/122 |

OTHER PUBLICATIONS

DVB Organization : "SCTE ARRIS Virtualized CCAP.pdf", DVB, Digital Video Broadcasting, C/O EBU—17A Ancienne Route—CH-1218 Grans Saconnex, Geneva—Switzerland, Oct. 26, 2017 (Aug. 26, 2017) paragraphs [0013]—[0042]; claim 1.
International Search Report and Written Opinion RE: Application No. PCT/US2021/033002, dated Dec. 13, 2021.

* cited by examiner

SECURE ACCESS FOR VCORES

CROSS REFERENCE TO RELATED APPLICATIONS

The present application claims priority under 35 U.S.C. § 119(e) to U.S. Provisional Application No. 63/177,310 filed on Apr. 20, 2021, which is incorporated by reference herein in its entirety.

BACKGROUND

The subject matter of this application relates to secure access to vCores.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
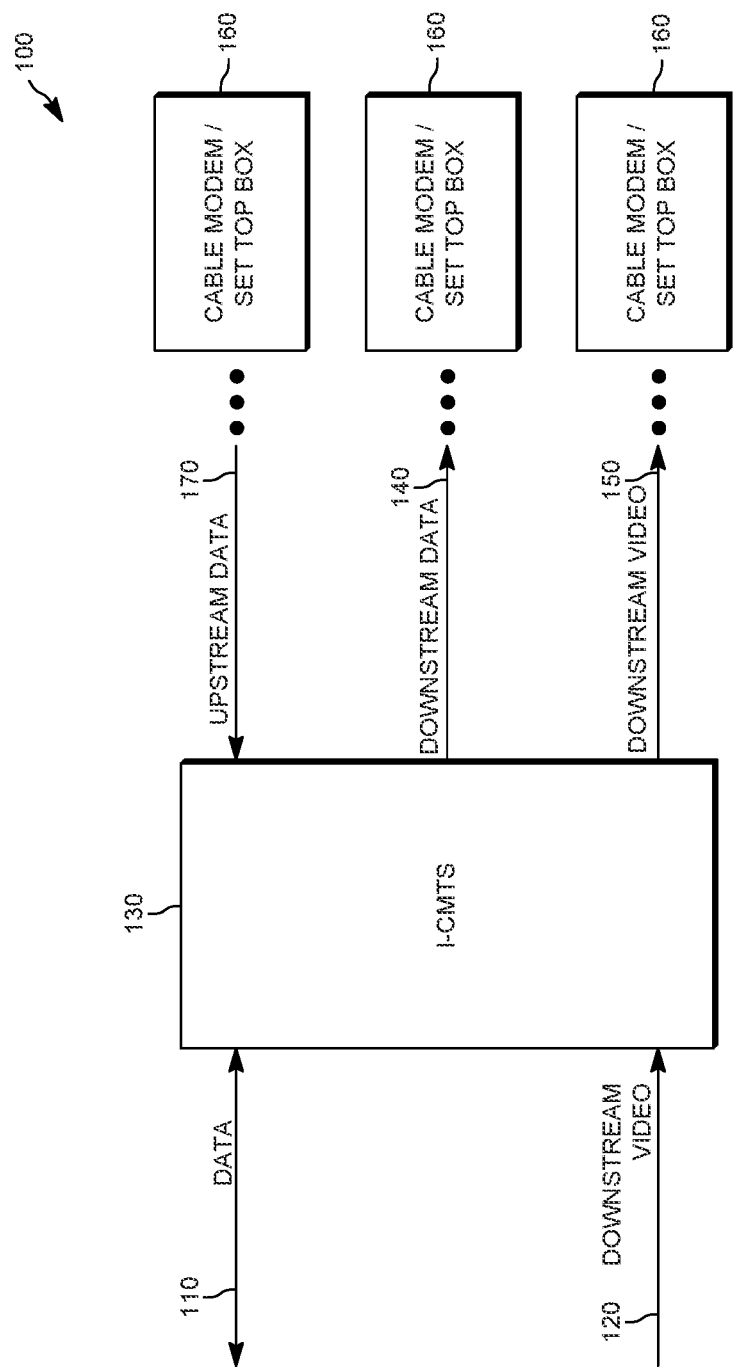
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
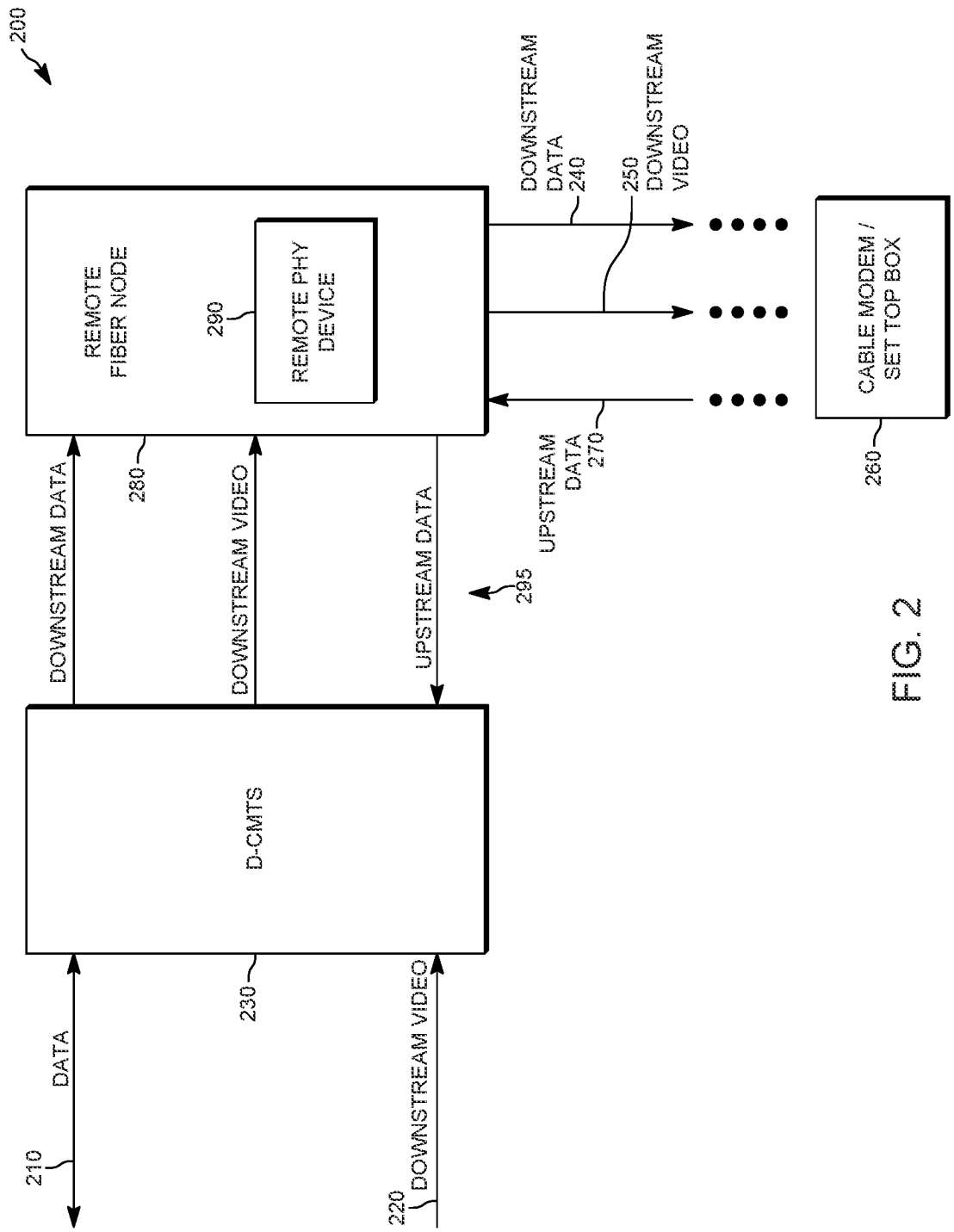
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOC SIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

I-CMTS devices are typically custom built hardware devices that consist of a single chassis that include a series of slots, each of which receives a respective line card with a processor, memory, and other computing and networking functions supported thereon. Each of the line cards include the same hardware configuration, processing capabilities, and software. Each of the line cards performs the functions of the I-CMTS device, including the MAC and PHY functionality. As the system increasingly scales to support additional customers, additional line cards are included with the system to expand the processing capability of the system. Unfortunately, it is problematic to dynamically scale the number of line cards in a real-time manner to meet the demands of a particular network.

The computational power of microprocessor based commercial off the shelf (COTS) server platforms are increasing while the expense of such systems is decreasing over time. With such systems, a computing system may be, if desired, virtualized and operated using one or more COTS server, generally referred to herein as a virtual machine. Using container technologies running on the COTS server and/or virtual machine, the COTS server may operate with only a single operating system. Each of the virtualized applications may then be isolated using software containers, such that the virtualized application may not see and are not aware of other virtualized applications operating on the same machine. Typically, each COTS server includes one or more Intel/AMD processors (or other processing devices) with associated memory and networking capabilities running an operating system software. Typically the COTS servers include a framework and an operating system where user applications are run on such framework and the operating system is abstracted away from the actual operating system. Each virtual machine may be instantiated and operated as one or more software applications running on a COTS server. A plurality of software containers may be instantiated and operated on the same COTS server and/or the same virtual machine. A plurality of COTS servers is typically included in one or more data centers, each of which are in communication with one another. A plurality of COTS server may be located in different geographic areas to provide geo-redundancy. In some embodiments, the container may include the same functionality as a virtual machine, or vice versa. In some embodiments, a grouping of containerized components, generally referred to as a pod, may be in the form of a virtual machine.

In some embodiments, the COTS servers may be "bare metal" servers that typically include an operating system thereon together with drivers and a portion of a container orchestration system. One or more containers are then added to the "bare metal" server while being managed by the container orchestration system. The container orchestration system described herein may likewise perform as, and be referred to as, a virtual machine orchestration system, as desired. In some embodiments, "bare metal" servers may be used with pods running on the operating system thereon together with drivers and a container orchestration system. In some embodiments, virtual machines may be omitted from the COTS servers.

Selected software processes that are included on a line card and/or a remote PHY device may be run on a "bare metal" server and/or virtual machine, including software containers, running on a COTS server, including both "active" and "back-up" software processes. The functionality provided by such a "bare metal" server and/or virtual machine may include higher level functions such as for example, packet processing that includes routing Internet packet provisioning, layer 2 virtual private networking which operates over pseudowires, and multiprotocol label switching routing. The functionality provided by such a "bare metal" server and/or virtual machine may include DOCSIS functions such as for example, DOCSIS MAC and encapsulation, channel provisioning, service flow management, quality of service and rate limiting, scheduling, and encryption. The functionality provided by such a "bare metal" server and/or virtual machine may include video processing such as for example, EQAM and MPEG processing.

Each of the COTS servers and/or the virtual machines and/or software containers may contain different hardware profiles and/or frameworks. For example, each of the COTS servers and/or "bare metal" servers and/or virtual machines and/or software containers may execute on different processor types, different number of processing cores per processor, different amounts of memory for each processor type, different amounts of memory per processing core, different cryptographic capabilities, different amounts of available off-processor memory, different memory bandwidth (DDR) speeds, and varying types and capabilities of network interfaces, such as Ethernet cards. In this manner, different COTS servers and/or "bare metal" servers and/or virtual machines and/or software containers may have different processing capabilities that vary depending on the particular hardware. Each of the COTS servers and/or "bare metal" servers and/or the virtual machine and/or software containers may contain different software profiles. For example, each of the COTS servers and/or "bare metal" servers and/or virtual machines and/or software containers may include different software operating systems and/or other services running thereon, generally referred to herein as frameworks. In this manner, different COTS servers and/or "bare metal" servers and/or virtual machines and/or software containers may have different software processing capabilities that vary depending on the particular software profile.

Figure 3:
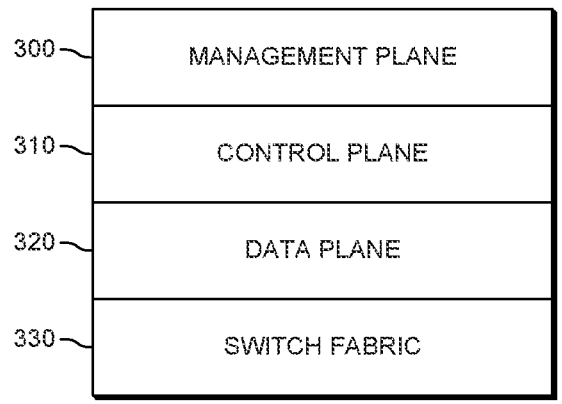
FIG. 3 illustrates a layered network processing stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, a data plane 320, and switch fabric 330 to effectuate sending and receiving packets of data.

For example, the management plane 300 may be generally considered as the user interaction or otherwise the general software application being run. The management plane typically configures, monitors, and provides management, and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

For example, the switch fabric 330 provides a network topology to interconnect network nodes via one or more network switches.

As the system increasingly scales to support additional customers, additional COTS servers and/or "bare metal" servers and/or virtual machines and/or software containers are included with the system to expand the processing capability of the overall system. To provide processing redundancy, one or more additional COTS servers and/or "bare metal" servers and/or virtual machines and/or software containers may be included that are assigned as "back-up" which are exchanged for an "active" process upon detection of a failure event. The scaling of the data plane 320 on COTS servers and/or "bare metal" servers and/or virtual machines and/or software containers to service dynamically variable processing requirements should be performed in such a manner that ensures sufficiently fast processing of data packets and sufficient bandwidth for the transmission of the data packets to ensure they are not otherwise lost.

It is desirable to virtualize the data plane, and in particular a portion of the Remote PHY functionality on a COTS server and/or "bare metal" servers. In this manner, the MAC cores for the cable distribution system may run on COTS servers and/or "bare metal" servers. By way of reference herein, a virtualized Remote PHY MAC Core may be referred to herein as a vCore instance.

Figure 4:
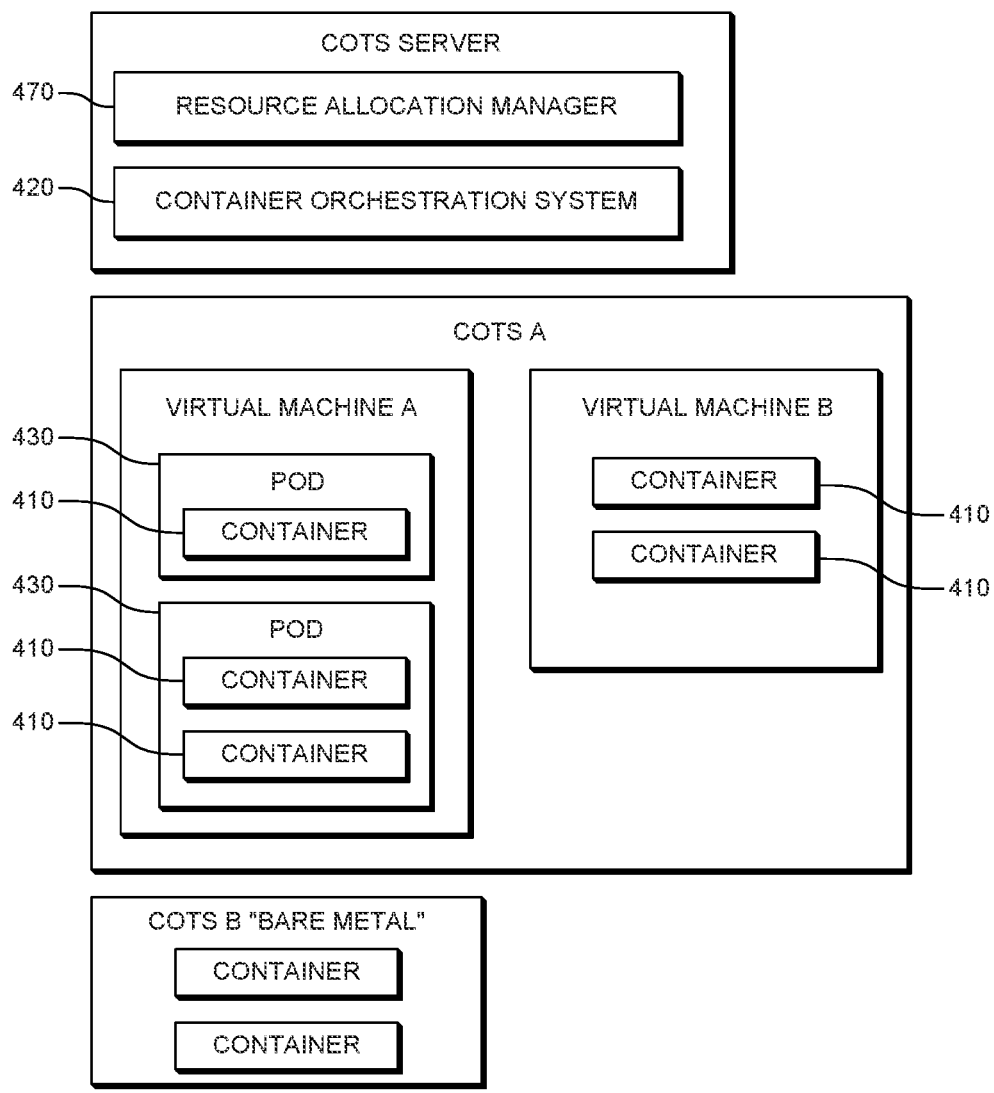
FIG. 4 illustrates a server system with a resource allocation manager and a container orchestration system.

Referring to FIG. 4, it is desirable to incorporate platform as a service that uses operating system level virtualization to deliver software in packages, generally referred to as containers 410. Each of the containers are isolated from one another and bundle their own software, libraries, and configuration files. The containers may communicate with one another using defined channels. As a general matter, one or more applications and its dependencies may be packed in a virtual container that can run on a COTS server and/or "bare metal" server and/or a virtual machine. This containerization increases the flexibility and portability on where the application may run, such as an on-premises COTS server, a "bare metal" server, a public cloud COTS server, a private cloud COTS server, or otherwise. With each container being relatively lightweight, a single COTS server and/or "bare metal" server and/or a virtual machine operating on a COTS server and/or "bare metal" server may run several containers simultaneously. In addition, the COTS server and/or "bare metal" server and/or the virtual machine and/or the containers may be distributed within the cable distribution system.

A COTS server and/or "bare metal" server and/or a virtual machine may include a container orchestration system 420 for automating the application deployment, scaling, and management of the containers 410 across one or more COTS servers and/or "bare metal" servers and/or virtual machines. Preferably the computing device running the container orchestration system 420 is separate from the computing device providing the containers for the dataplane applications. It is to be understood that the virtual machine illustrated in FIG. 4 may be omitted, such as the COTS B. The application deployment, scaling, and management of the containers may include clusters across multiple hosts, such as multiple COTS servers. The deployment, maintaining, and scaling, of the containers may be based upon characteristics of the underlying system capabilities, such as different processor types, different number of processing cores per processor, different amounts of memory for each processor type, different amounts of memory per processing core, different amounts of available off-processor memory, different memory bandwidth (DDR) speeds, different frameworks, and/or varying types and capabilities of network interfaces, such as Ethernet cards. Moreover, the container orchestration system 420 may allocate different amounts of the underlying system capabilities, such as particular processor types, a selected number of processors (e.g., 1 or more), a particular number of processing cores per selected processor, a selected amount of memory for each processor type, a selected amount of memory per processing core, a selected amount of available off-processor memory, a selected framework, and/or a selected amount and/or type of network interface(s), such as Ethernet cards. A corresponding agent for the container orchestration system 420 may be included on each COTS server (e.g., COTS A and/or COTS B).

The container orchestration system 420 may include a grouping of containerized components, generally referred to as a pod 430. A pod consists of one or more containers that are co-located on the same COTS server and/or "bare metal" server and/or the same virtual machine, which can share resources of the same COTS server and/or "bare metal" server and/or same virtual machine. Each pod 430 is preferably assigned a unique pod IP address within a cluster, which allows applications to use ports without the risk of conflicts. Within the pod 430, each of the containers may reference each other based upon a localhost or other addressing service, but a container within one pod preferably has no way of directly addressing another container within another pod, for that, it preferably uses the pod IP address or otherwise an addressing service.

A traditional D-CMTS RPHY Core may be implemented as a specialty built appliance including both software and hardware to achieve desired performance characteristics, such as ensuring the timing of the transfer of data packets. The specially built appliance is not amenable to automatic deployment nor automatic scaling due to the fixed nature of its characteristics. In contrast to a specially built appliance, the vCore instance is preferably implemented in software operating on a COTS server and/or "bare metal" server on top of an operating system, such as Linux. The vCore instance is preferably implemented in a manner that readily facilitates automation techniques such as lifecycle management, flexible scaling, health monitoring, telemetry, etc. Unfortunately, running a vCore instance on a COTS server and/or "bare metal" server tends to result in several challenges, mostly related to the data plane components. One of the principal challenges involves ensuring that data is provided to the network in a timely and effective manner to achieve the real time characteristics of a cable data distribution environment. The cable data distribution environment includes real time constraints on the timing of data packet delivery, which is not present in typical web-based environments or database environments.

Each vCore instance is preferably implemented within a container, where the size (e.g., scale, memory, CPU, allocation, etc.) of each container translates into the amount of server hardware and software resources assigned to the particular vCore instance. The amount of server hardware and software resources assigned to each particular vCore instance is preferably a function of the number of groups of customers (e.g., service groups) and/or number of customers that the vCore instance can readily provide RPHY MAC Core services to. For example, a limited amount of server hardware and software resources may be assigned to a particular vCore instance that has a limited number of groups of customers and/or customers. For example, a substantial amount of server hardware and software resources may be assigned to a particular vCore instance that has a substantial number of groups of customers and/or customers. For example, selected server hardware resources are preferably allocated among the different vCore instances in a non-overlapping manner so that each vCore instance has a dedicated and predictable amount of server hardware resources. For example, selected software resources are preferably allocated among the different vCore instances in a non-overlapping manner so that each vCore instance has a dedicated and predictable amount of software resources.

For example, the number of CPU cores preferably assigned to each vCore instance (Cc) may be a function of the total USSG (upstream service groups—groups of customer modems and/or set top boxes) (USsg) and the total DSSG (downstream service groups—groups of customer modems and/or set top boxes) (DSsg) connected through that vCore instance. This may be represented as vCore: $Cc=f_1$ (USsg, DSsg). Other hardware and/or software characteristics may likewise be assigned, as desired.

For example, the network capacity assigned to each vCore instance (Cbw) may be a function of the of the total USSG (upstream service groups—groups of customer modems and/or set top boxes) (USsg) and the total DSSG (downstream service groups—groups of customer modems and/or set top boxes) (DSsg) connected to that vCore instance. This may be represented as $Cbw=f_2$ (USsg, DSsg). Other hardware and/or software characteristics may likewise be assigned, as desired.

The scaling of the vCore instance may refer to the capability to automatically create and deploy a vCore instance within a container on a COTS server and/or "bare metal" server and/or virtual machine that is appropriately sized to serve a particular set of remote physical devices and/or service groups (e.g., sets of cable customers) and/or cable customers. The scaling of the vCore instance may also include, in some cases, the capability to automatically modify the hardware and/or software characteristics of an existing vCore instance within a container on a COTS server and/or "bare metal" server and/or virtual machine to be appropriately sized to serve a modified particular set of remote physical devices and/or service groups (e.g., sets of cable customers) and/or cable customers.

A resource allocation manager 470 may assign or reallocate a suitable amount of hardware and software of the COTS server and/or "bare metal" server resources to each particular vCore instance (e.g., CPU cores, and/or memory, and/or network capacity). The amount of such COTS server and/or "bare metal" server hardware and software resources assigned to or reallocate to each vCore instance may be a function of its scale and also other features, such as various other resource allocations. A corresponding agent for the resource allocation manager 470 may be included on each COTS server (e.g., COTS A, COTS B).

The vCore instance includes data plane software for the transfer of data packets and other functions of the data plane. The data plane software may include a set of data plane libraries and network interface controller (NIC) drivers that are used to manage the data packets for the data plane. Preferably, the data plane software operates in user space, as opposed to Kernel space like typical network processing software, thus it does not make use of the operating system kernel and container management network drivers and plugins. For example, the data plane software may include a queue manager, a buffer manager, a memory manager, and/or a packet framework for packet processing. The data plane software may use CPU cores that are isolated from the Kernel, meaning that the operating system scheduled processes are not running on these isolated CPU cores. The separation of the CPU cores between the data plane software and the operating system software ensures that tasks performed by the operating system software does not interfere with the data plane software processing the data packets in a timely manner. In addition, the separation of the CPU cores between the data plane software and the operating system software enables both to use the same physical central processing unit, albeit different cores, of the same physical central processing unit. In addition, other hardware and/or software capabilities may likewise be separated, such as for example, selected processors (e.g., 1 or more), particular number of processing cores per selected processor, selected amount of memory for each processor type, selected amount of memory per processing core, selected amount of available off-processor memory, selected framework, and/or selected amount and/or type of network interface(s).

It is also desirable for each vCore instance to have dedicated network bandwidth capability apart from other vCore instances and the operating system software. To provide dedicated network bandwidth for a vCore instance, the physical network interface cards may be virtualized so that a plurality of different software applications can make use of the same network interface card, each with a guaranteed amount of bandwidth available. The network interface cards are preferably virtualized using a single root input/output virtualization technique (SR-IOV). The SR-IOV partitions the NIC physical functions (e.g., PFs) into one or more virtual functions (VFs). The capabilities of the PFs and VFs are generally different. In general, the PF supports queues, descriptions, offloads, hardware lock, hardware link control, etc. In general, the VF supports networking features based upon queues and descriptors.

The automated creation, deployment, and removal of vCore instances may be performed by the container orchestration system 420.

Figure 5:
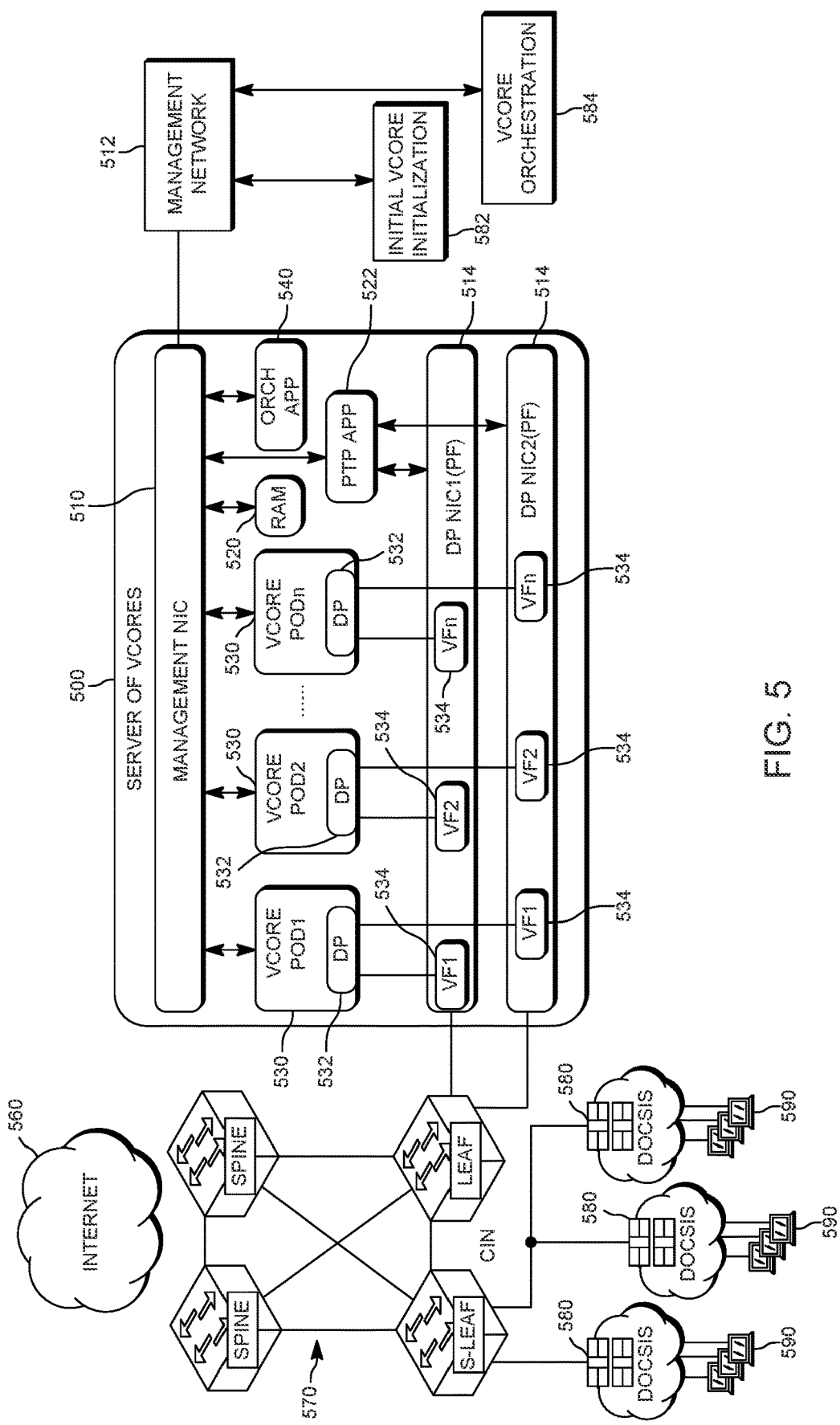
FIG. 5 illustrates a server system with containers and a container orchestration system.

Referring to FIG. 5, the vCore instances 530 may operate on a COTS server and/or "bare metal" server 500 acting as a remote PHY MAC core for one or more remote physical devices connected over a converged interconnect network, normally located in the same hub. The vCore instances 530 may include data plane software 532. Each of the vCore instances 530 as generally referred to as a POD. In some cases, multiple vCores may be included in a POD. The COTS server 500 may communicate with the Internet 560, a set of networking switches 570, to remote physical devices 580, and the customers 590. The COTS server and/or "bare metal" server including the vCore instances operating thereon is typically a relatively high performance server that has one or more of the following characteristics:

Hardware:

At least one management NIC 510 is connected to, usually, a separate management network 512. The management NIC 510 is primarily used for orchestration and management of the server application, which may also manage the data traffic.

Preferably at least two (for redundancy) data plane NICs 514 (i.e., data plane physical network interfaces) together with SR-IOV and PTP (IEEE 1588) 522 are included for hardware timestamping capabilities of the data packets. The data plane NICs 514 are used to provide connectivity to the remote physical devices and the customer modems and/or set top boxes/consumer premises equipment behind such remote physical devices. The vCore instances 530 may each include a virtual function 534 network interface to each of the data plane NICs 514.

In addition, the hardware may include dedicated devices for DES encryption.

Software:

Preferably the operating system on the COTS server and/or "bare metal" server is a LINUX OS such as Ubuntu, Redhat, etc.

The COTS Server and/or "bare metal" server and/or virtual machine includes container software.

The COTS Server and/or "bare metal" server and/or virtual machine and/or other server includes at least a part of a container orchestration system.

The COTS Server and/or "bare metal" server and/or virtual machine and/or other server includes a resource allocation manager (RAM) 520 that manages, at least in part, the server allocation of software and/or hardware resources for vCore instances, including for example: CPU Cores, memory, VFs, MAC addresses, etc. The RAM 520 may also provide server configuration, including OS configuration, driver support, etc., diagnostics and health monitoring. The COTS Server and/or "bare metal" server and/or virtual machine and/or other server may include an orchestration app 540 that manages, at least in part, the management of the vCores (e.g., containers and/or pods).

The COTS Server and/or "bare metal" server and/or virtual machine and/or other server may run the PTP application 522 that synchronizes the system clock of the COTS Server and/or "bare metal" server and/or virtual machine and/or vCore instances 520 based upon a grand master clock for the system as a whole. For increased accuracy, the PTP application 522 is preferably based upon hardware time stamping and a Precise Hardware Clock that is present on the NICs 514. As a general matter, the vCore preferably performs the MAC layer functionality.

Figure 6:
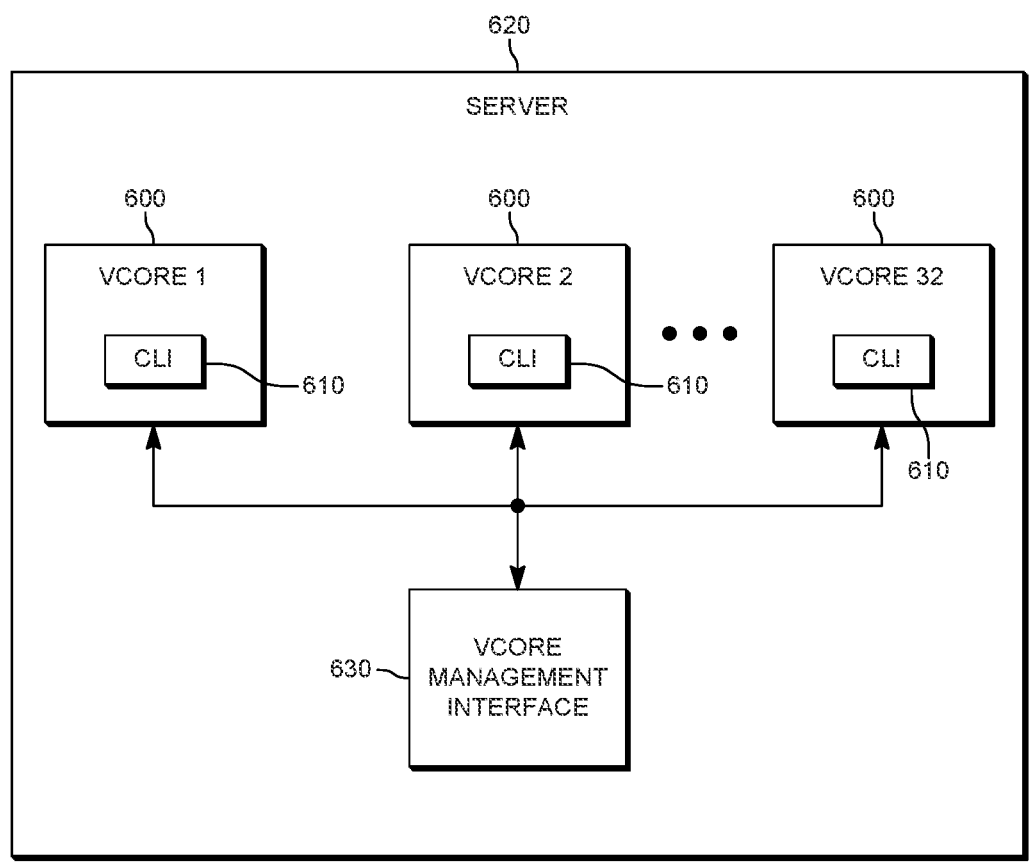
FIG. 6 illustrates a set of vCores and a vCore management interface.

Referring to FIG. 6, a simplified illustration shows each of the vCores 600 traditionally includes a command line interface 610 to receive instructions thereto for configuration, diagnostics, control, and management. The command line interface processes commands in the form of lines of text. A command line interface may be provided using a shell to provide interactive access to the corresponding operating system functions or services. A plurality of vCores, such as 32 vCores, may be installed on a COTS Server and/or "bare metal" server and/or virtual machine and/or other server 620 (generally referred to herein as a "server"). Each of the vCores 600 on the server 620 includes a respective command line interface 610. A vCore management interface 630 provides access to each of the respective vCores 700, such as opening up a respective terminal window, to facilitate access to the respective command line interface 610. By way of example, an operator may open a terminal window to access the command line interface on a first vCore and execute commands thereon. For example, bidirectional interactive text-oriented communications may be used for such command execution, such as Telnet. In order to provide such configuration, diagnostics, control, and management for each of the vCores, at least 32 such terminal windows are opened and 32 sets of commands are executed. For a large system, there may be many servers each having a substantial number of vCores, therefore resulting in potentially thousands of vCores that periodically need to be accessed on an individual basis. This is a burdensome task to undertake using the management interface 630.

The vCores are preferably instantiated within a respective POD within a Kubernetes infrastructure. Kubernetes is primarily designed for the horizontally scaled deployment of microservices, especially for load balancing. With the POD/Kubernetes infrastructure the vCores preferably do not include an externally visible endpoint external to the POD/Kubernetes infrastructure. Depending on the configuration, such as a non-POD/Kubernetes infrastructure, it is not desirable to include an externally visible endpoint to each vCore due to limitations in the number of available such externally visible endpoints (e.g., IP addresses within a name space), the management of such externally visible endpoints, and security considerations. However, with the vCores providing data plane services within the POD/Kubernetes infrastructure it is desirable to have addressable access to the data plane services of each respective vCore. Previously existing tools for managing a CMTS are not well adapted to the management of vCores within the POD/Kubernetes infrastructure due, in part, to the absence of a unique externally addressable interface to the POD/Kubernetes infrastructure (aka externally addressable IP address). Accordingly, the POD/Kubernetes infrastructure with vCores hosted thereon does not include out of band management capabilities. Also, accessing the POD/Kubernetes infrastructure with vCores hosted thereon through the local network, using in band management, is not desirable because using a terminal window to access the command line interface on a first vCore and executing commands thereon using unencrypted clear text which would normally be transmitted through the Internet to the server(s) raises substantial security considerations.

Figure 7:
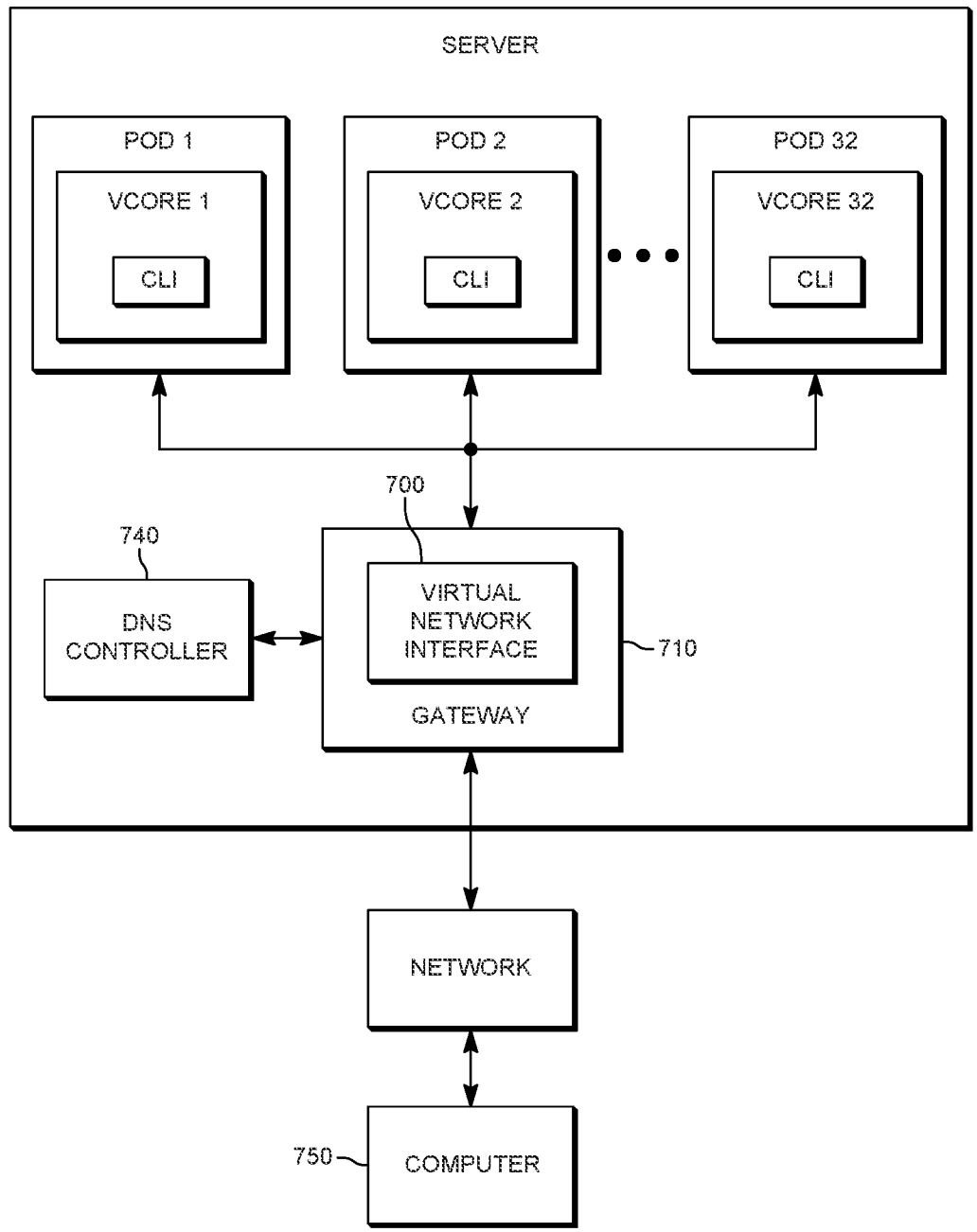
FIG. 7 illustrates a set of vCores and a gateway.

Referring to FIG. 7, to provide access to the vCores of the POD/Kubernetes infrastructure it is desirable to include a virtual network interface 700, which is an abstract virtualized representation of a computer network interface, as part of a gateway 710. Each of the vCores includes an internally accessible service endpoint that is accessible internally to the POD/Kubernetes infrastructure, and not directly accessible externally to the POD/Kubernetes infrastructure. By way of example, the service endpoint of a vCore may be vCore1.123.Cable-Network.Service-endpoint and the service endpoint of another vCore may be vCore2.123.Cable-Network.Service-endpoint. The gateway 710 using the virtual network interface 700 in combination with a Kubernetes Domain Name System Controller 740 included within the POD/Kubernetes infrastructure, resolves the location/access of the respective vCore. In this manner, each vCore is mapped to the gateway 710 with an internally accessible service endpoint, while each vCore is not mapped with an externally accessible service endpoint (e.g., not externally routable) to the POD/Kubernetes infrastructure. The commands that are provided within the POD/Kubernetes infrastructure to the vCores from the gateway, are preferably non-encrypted text, which are suitable for traditional management tools. Moreover, by limiting such non-encrypted text being exchanged from within the POD/Kubernetes infrastructure it is not prone to security concerns.

While non-encrypted exchanges are permitted between the gateway 710 and the vCores within the POD/Kubernetes infrastructure, the gateway 710 includes one or more externally accessible service endpoints to the POD/Kubernetes infrastructure (e.g., IP address) that only permits encrypted exchanges, such as through a secure socket shell, across an unsecured network (e.g., the Internet) from a computer 750. As it may be observed, the gateway within the POD/Kubernetes infrastructure performs as an aggregation point for the internal vCores to be accessed by an external computer. The gateway also permits the use of non-encrypted scripts to provide configuration, diagnostics, control, and management of the vCores in an efficient manner while access to the gateway is provided in an encrypted manner. In this manner, there may be a single, encrypted, aggregated command line interface access point covering an entire cluster of vCores, while within the POD/Kubernetes infrastructure a non-encrypted channel is used. By way of example, the service ports for the telnet communications may be managed as a pool resource with a configurable fixed pool size that are shared across multiple telnet sessions which terminate on the same vCore. A service port may be removed once all sessions using it have terminated.

The gateway is preferably configured with the configuration, diagnostics, control, and management software that is used to communicate with the vCores. In this manner, the external connection to the gateway is configured in a such a manner that any attempt to run any other command within the restricted shell results in immediate termination of the shell/user's session with the gateway. Authentication of external access to the gateway may be dependent upon credentials. By way of example, the command line access using the external secure socket shell permits access by name to a vCore, access that may be filtered by node name, and access using a full list of available vCores. The access route from the gateway may be provided by a dynamically created Kubernetes service route from the gateway to the vCore. Existing service routes may be (re)used when currently instantiated and not torn down when still in use, or otherwise cleaned up. The terminal configuration may be preserved such that command line interface command expansion/extension, history, and help features are preserved. Also, for auditing purposes the gateway logs the user name, access time on login, and the user name and exit time upon exiting the application/service. Also, additional software may be included to complement the gateway to allow users to automate the running of configuration and diagnostic scripts through the gateway at the target vCore(s) and to return the results.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A cable distribution system comprising: (a) a head end connected to a plurality of customer devices through a transmission network that includes a remote fiber node, that converts received data to analog data suitable to be provided on a coaxial cable for said plurality of customer devices, where said head end includes at least one server each of which includes a respective processor; (b) a plurality of vCores instantiated on one of said at least one servers of said head end configured within a container to provide services to said plurality of customer devices through said transmission network, where each of said vCores only includes a service endpoint with a respective address that is accessible from within said container while each of said vCores does not include any service endpoints with a respective address that are directly accessible from a network address exterior to said container; (c) a gateway instantiated on said one of said at least one servers of said head end within said container that provides configuration, diagnostics, control, or management access to each of said plurality of vCores using said service endpoint over a non-encrypted channel; (d) said gateway provides configuration, diagnostics, control, or management access to said gateway from a plurality of network addresses exterior to said container over a respective encrypted channel; (e) said gateway aggregates configuration, diagnostics, control, or management access to said plurality of vCores from said network addresses exterior to said container over said respective encrypted channels; (f) where said encrypted channels to said gateway from respective said network addresses exterior to said container are used to access a said service endpoint of a respective said vCore over a non-encrypted channel; (g) said configuration, diagnostics, control, or management access is configured such that any attempt to configure, diagnose, control, or manage said plurality of vCores from said network addresses exterior to said container over said respective encrypted channels results in immediate termination of said configuration, diagnostics, control, or management access to said gateway.

2. The cable distribution system of claim 1 wherein said head end connected to said plurality of customer devices through said transmission network includes a plurality of remote physical nodes that include physical layer processing and provide data suitable for said plurality of customer devices.

3. The cable distribution system of claim 1 wherein each of said vCores includes a respective command line that is accessible by said gateway from said service endpoint.

4. The cable distribution system of claim 1 wherein each of said plurality of vCores is accessible by using telnet by said gateway from said service endpoint.

5. The cable distribution system of claim 1 wherein each of said plurality of vCores is instantiated within a respective pod.

6. The cable distribution system of claim 1 wherein each of said plurality of vCores does not include an externally addressable IP address to said container.

7. The cable distribution system of claim 1 wherein said gateway includes a virtual network interface to provides said access to each of said plurality of vCores using said service endpoint over said non-encrypted channel.

8. The cable distribution system of claim 1 wherein said gateway provides said access to each of said plurality of vCores that is resolved based upon a domain name system controller included within said container.

9. The cable distribution system of claim 1 wherein said gateway does not said provides access to said gateway from said network address exterior to said container over a non-encrypted channel.

10. The cable distribution system of claim 1 wherein said gateway provides said access to respective said plurality of vCores by name.

11. The cable distribution system of claim 1 wherein said gateway provides said access to respective said plurality of vCores filtered by name.

12. The cable distribution system of claim 1 wherein said gateway provides said access to respective said plurality of vCores using a full list of available said plurality of vCores.

* * * * *